(12) United States Patent
Kraehe et al.

(10) Patent No.: US 11,543,269 B2
(45) Date of Patent: Jan. 3, 2023

(54) TARGET DETECTION IN MAGNETOSTRICTIVE SENSORS USING A TARGET FREQUENCY RANGE

(71) Applicants: Frank Kraehe, Morrisville, NC (US); Aleksey Minin, Cary, NC (US); Arnold F. Sprecher, Morrisville, NC (US)

(72) Inventors: Frank Kraehe, Morrisville, NC (US); Aleksey Minin, Cary, NC (US); Arnold F. Sprecher, Morrisville, NC (US)

(73) Assignee: Temposonics GmbH & Co. KG, Lüdenscheid (DE)

( * ) Notice: Subject to any disclaimer, the term of this patent is extended or adjusted under 35 U.S.C. 154(b) by 0 days.

(21) Appl. No.: 17/160,123

(22) Filed: Jan. 27, 2021

(65) Prior Publication Data

US 2021/0231468 A1     Jul. 29, 2021

Related U.S. Application Data

(60) Provisional application No. 62/966,309, filed on Jan. 27, 2020.

(51) Int. Cl.
*G01D 5/48* (2006.01)
(52) U.S. Cl.
CPC .................................. *G01D 5/485* (2013.01)
(58) Field of Classification Search
CPC .... G01D 5/485; G01N 29/11; G01N 29/2412; G01N 29/46
See application file for complete search history.

(56) References Cited

U.S. PATENT DOCUMENTS

| 1,975,918 A | 10/1934 | Berg |
| 2,069,413 A | 2/1937 | Leadbetter |

(Continued)

FOREIGN PATENT DOCUMENTS

| DE | 102018117285 A1 | 1/2020 |
| EP | 0591779 B1 | 6/1997 |

(Continued)

OTHER PUBLICATIONS

International Search Report and Written Opinion for International application No. PCT/IB2021/050644, filed Jan. 27, 2021.

*Primary Examiner* — Jay Patidar
(74) *Attorney, Agent, or Firm* — Steven M. Koehler; Westman, Champlin & Koehler, P.A.

(57) ABSTRACT

A magnetostrictive position measuring method determines a time of flight of a magnetostrictive response transmitted through a waveguide. The magnetostrictive response is generated using a target magnet in response to a magnetostrictive excitation. In the method, an electrical response signal containing an indicator of the magnetostrictive response is digitally sampled at a sampling rate to obtain a plurality of samples. An amplitude of each of the plurality of samples within a target frequency range is determined through an analysis of the plurality of samples in a frequency domain. A peak sample from the plurality of samples in the frequency domain corresponding to the magnetostrictive response is identified. The time of flight and a position of the target magnet along the waveguide is determined based on the peak sample.

20 Claims, 5 Drawing Sheets

(56) References Cited

U.S. PATENT DOCUMENTS

| | | |
|---|---|---|
| 2,166,848 A | 7/1939 | Prudden |
| 2,355,568 A | 8/1944 | Smith |
| 2,442,347 A | 6/1948 | Eklund |
| 2,541,159 A | 2/1951 | Geiger |
| 2,586,043 A | 2/1952 | Hodgson et al. |
| 3,046,781 A | 7/1962 | Pratt |
| 3,087,568 A | 4/1963 | Kurtze |
| 3,087,569 A | 4/1963 | Kurtze |
| 3,117,054 A | 1/1964 | Antonucci |
| 3,587,305 A | 6/1971 | Parkinson et al. |
| 3,824,848 A | 7/1974 | Parkinson |
| 3,898,555 A | 8/1975 | Tellerman |
| 3,956,973 A | 5/1976 | Pomplas |
| 4,028,619 A | 6/1977 | Edwards |
| 4,033,042 A | 7/1977 | Bently |
| 4,050,266 A | 9/1977 | Bergman |
| 4,071,818 A | 1/1978 | Krisst |
| 4,148,013 A | 4/1979 | Finn et al. |
| 4,184,562 A | 1/1980 | Bakamjian |
| 4,298,861 A | 11/1981 | Tellerman |
| 4,319,189 A | 3/1982 | Cullum, Jr. et al. |
| 4,392,681 A | 7/1983 | Raquet |
| 4,534,526 A | 8/1985 | Metzger et al. |
| 4,566,231 A | 1/1986 | Konsevich |
| 4,678,993 A | 7/1987 | Vinnemann et al. |
| 4,721,902 A | 1/1988 | Tellerman et al. |
| 4,778,028 A | 10/1988 | Staley |
| 4,803,427 A | 2/1989 | Mason et al. |
| 4,803,885 A | 2/1989 | Nonomura et al. |
| 4,811,609 A | 3/1989 | Nishibe et al. |
| 4,828,202 A | 5/1989 | Jacobs et al. |
| 4,828,203 A | 5/1989 | Clifton et al. |
| 4,839,590 A | 6/1989 | Koski et al. |
| 4,891,992 A | 1/1990 | Kobayashi et al. |
| 4,901,947 A | 2/1990 | Rayner |
| 4,907,462 A | 3/1990 | Obama et al. |
| 4,939,937 A | 7/1990 | Klauber et al. |
| 4,943,773 A | 7/1990 | Koski et al. |
| 4,952,873 A | 8/1990 | Tellerman |
| 4,972,441 A | 11/1990 | Roberts et al. |
| 4,979,399 A | 12/1990 | Klauber et al. |
| 5,017,867 A | 5/1991 | Dumais et al. |
| 5,038,615 A | 8/1991 | Trulson et al. |
| 5,043,685 A | 8/1991 | Nyce |
| 5,076,100 A | 12/1991 | Hunter et al. |
| 5,107,711 A | 4/1992 | Aoki et al. |
| 5,115,195 A | 5/1992 | Peterson et al. |
| 5,206,586 A | 4/1993 | Yauch et al. |
| 5,206,838 A | 4/1993 | Kashiwase |
| 5,209,428 A | 5/1993 | Bevilaqua et al. |
| 5,228,349 A | 7/1993 | Gee et al. |
| 5,247,937 A | 9/1993 | Ophir et al. |
| 5,275,356 A | 1/1994 | Bollinger et al. |
| 5,311,124 A | 5/1994 | Hubbard et al. |
| 5,312,069 A | 5/1994 | Bollinger et al. |
| 5,313,159 A | 5/1994 | Allwine, Jr. |
| 5,313,160 A | 5/1994 | Gloden et al. |
| 5,320,305 A | 6/1994 | Oatway et al. |
| 5,334,933 A | 8/1994 | Tellerman |
| 5,363,317 A | 11/1994 | Rice et al. |
| 5,367,255 A | 11/1994 | Nyce et al. |
| 5,381,692 A | 1/1995 | Winslow et al. |
| 5,420,589 A | 5/1995 | Wells et al. |
| 5,430,432 A | 7/1995 | Camhi et al. |
| 5,449,418 A | 9/1995 | Takagi et al. |
| 5,495,774 A | 3/1996 | Klauber et al. |
| 5,508,609 A | 4/1996 | Parkinson et al. |
| 5,514,952 A | 5/1996 | Parkinson |
| 5,545,984 A | 8/1996 | Gloden et al. |
| 5,587,680 A | 12/1996 | Smith |
| 5,587,969 A | 12/1996 | Kroemer et al. |
| 5,590,091 A | 12/1996 | Gloden et al. |
| 5,675,095 A | 10/1997 | Ballantyne |
| 5,705,769 A | 1/1998 | Hanson |
| 5,712,447 A | 1/1998 | Hanson |
| 5,717,330 A | 2/1998 | Moreau et al. |
| 5,736,855 A | 4/1998 | Smith et al. |
| 5,760,302 A | 6/1998 | Moradi et al. |
| 5,796,247 A | 8/1998 | Pape |
| 5,818,038 A | 10/1998 | Kerkmann et al. |
| 5,877,420 A | 3/1999 | Moradi et al. |
| 5,902,934 A | 5/1999 | Sprague et al. |
| 5,922,952 A | 7/1999 | Moradi et al. |
| 5,965,853 A | 10/1999 | Hornsey |
| 5,969,269 A | 10/1999 | Munyon et al. |
| 5,998,899 A | 12/1999 | Rosen et al. |
| 5,998,991 A | 12/1999 | Begin et al. |
| 6,068,081 A | 5/2000 | Capdepuy et al. |
| 6,119,807 A | 9/2000 | Benson, Jr. et al. |
| 6,131,454 A | 10/2000 | Kopp et al. |
| 6,326,781 B1 | 12/2001 | Kunde et al. |
| 6,351,117 B1 | 2/2002 | Ehling |
| 6,366,531 B1 | 4/2002 | Varsamis et al. |
| 6,369,563 B1 | 4/2002 | Krahe et al. |
| 6,371,407 B1 | 4/2002 | Renshaw |
| 6,389,887 B1 | 5/2002 | Dusserre-Telmon et al. |
| 6,393,904 B1 | 5/2002 | Krug et al. |
| 6,397,988 B1 | 6/2002 | Ptak |
| 6,422,511 B1 | 7/2002 | Kalisz |
| 6,427,308 B1 | 8/2002 | Brunken |
| 6,439,067 B1 | 8/2002 | Goldman et al. |
| 6,441,608 B2 | 8/2002 | Brunsch et al. |
| 6,478,110 B1 | 11/2002 | Eatwell et al. |
| 6,516,286 B1 | 2/2003 | Aebischer et al. |
| 6,536,555 B1 | 3/2003 | Kelsic et al. |
| 6,538,429 B2 | 3/2003 | Schroeder et al. |
| 6,581,720 B1 | 6/2003 | Chen et al. |
| 6,700,304 B1 | 3/2004 | Fuller et al. |
| 6,708,626 B2 | 3/2004 | Ueda et al. |
| 6,757,635 B2 | 6/2004 | Topmiller |
| 6,790,520 B1 | 9/2004 | Todd et al. |
| 6,856,936 B1 | 2/2005 | Chen et al. |
| 2001/0037911 A1 | 11/2001 | Stanienda |
| 2002/0112549 A1 | 8/2002 | Cheshmehdoost et al. |
| 2003/0000417 A1 | 1/2003 | Ueda et al. |
| 2003/0146747 A1 | 8/2003 | Ehling |
| 2004/0024499 A1 | 2/2004 | Altieri et al. |
| 2005/0114053 A1 | 5/2005 | Southward |
| 2012/0280682 A1 | 11/2012 | Cheng |
| 2014/0203801 A1* | 7/2014 | Lehmann ............... G01D 5/20 324/207.17 |
| 2020/0025594 A1 | 1/2020 | Kantor et al. |
| 2020/0263710 A1 | 8/2020 | Grahl et al. |

FOREIGN PATENT DOCUMENTS

| | | |
|---|---|---|
| EP | 0797105 A2 | 9/1997 |
| EP | 0632250 B1 | 9/1999 |
| EP | 0732598 B1 | 5/2001 |
| EP | 0797105 B1 | 2/2003 |
| EP | 0889316 B1 | 2/2003 |
| EP | 1059511 B1 | 6/2003 |
| JP | 2002-303555 | 10/2002 |
| JP | 2002-365012 | 12/2002 |
| WO | WO 96/01410 | 1/1996 |
| WO | WO 98/34455 | 8/1998 |
| WO | WO 01/67412 | 9/2001 |
| WO | 2019064269 A1 | 4/2019 |

* cited by examiner

TARGET DETECTION IN MAGNETOSTRICTIVE SENSORS USING A TARGET FREQUENCY RANGE

CROSS-REFERENCE TO RELATED APPLICATION

The present application is based on and claims the benefit of U.S. provisional patent application Ser. No. 62/996,309, filed Jan. 27, 2020, the content of which is hereby incorporated by reference in its entirety.

FIELD

Embodiments of the present disclosure generally relates to magnetostrictive position measurement, and more specifically, to magnetostrictive position measurements using frequency domain analysis of a magnetostrictive response signal.

BACKGROUND

Magnetostrictive position measurement systems or linear position transducers are robust, high resolution instruments which have proven to be useful in many measurement and control applications. Magnetostrictive linear position systems generally include a wire waveguide and a target magnet that has a position that can vary relative to the waveguide. The location of the target magnet corresponds to the position to be measured.

An electrical excitation signal may be used to trigger a magnetostrictive response from the target magnet that may be used to detect its position. For example, the electrical excitation signal may be delivered to the target magnet through the waveguide. When the excitation signal reaches the area of influence of the target magnet, a magnetostrictive response in the form of a torsional strain is generated within the waveguide. The torsional strain produces an acoustic wave that travels along the waveguide to a detector located at a reference position. The period of time or "time of flight" between the generation of the electrical excitation signal and the detection of the magnetostrictive response (acoustic wave) at the detector indicates the position of the target magnet. Alternatively, a mechanical excitation may be employed to generate a magnetostrictive response from the target magnet.

The detector generates an electrical response signal that contains an indicator of the magnetostrictive response. Thus, the time of flight may be determined by identifying the indicator in the electrical signal. Two primary techniques are employed to detect the magnetostrictive response in the electrical response signal. In one technique, the electrical response signal is analyzed to determine when the electrical response signal crosses a predetermined threshold voltage. The timing of this threshold crossing is used to establish the time of flight and, thus, the position of the target magnet. An alternative technique uses a cross-correlation approach, in which the electrical response signal is analyzed to determine when it matches a predetermined waveform. The time of the match is used to establish the time of flight and the position of the target magnet.

The above-described techniques rely upon an expectation that the electrical response signal will have a specific shape. As a result, changes to the target magnet or other components of the magnetostrictive linear position transducer that alter the shape of the electrical response signal can affect the accuracy of the detection of the electrical response signal or render the transducer inoperable.

SUMMARY

Embodiments of the present disclosure are directed to magnetostrictive position measuring methods using a frequency domain analysis of a magnetostrictive response signal, and magnetostrictive position measuring systems for implementing the method.

One embodiment of the method determines a time of flight of a magnetostrictive response transmitted through a waveguide. The magnetostrictive response is generated using a target magnet in response to a magnetostrictive excitation. In the method, an electrical response signal containing an indicator of the magnetostrictive response is digitally sampled at a sampling rate to obtain a plurality of samples. An amplitude of each of the plurality of samples within a target frequency range is determined through an analysis of the plurality of samples in a frequency domain. A peak sample from the plurality of samples in the frequency domain corresponding to the magnetostrictive response is identified. The time of flight and a position of the target magnet along the waveguide is determined based on the peak sample.

In one embodiment of the method, the peak sample corresponds to one of the plurality of samples in the frequency domain having the largest amplitude, and the time of flight extends from a generation of the magnetostrictive excitation to approximately a sample time of the peak sample, and is measured using a clock generator.

In one embodiment, the time of flight extends from the generation of the magnetostrictive excitation to an offset from the sample time, and the offset is based on a weighted average of the amplitudes of a plurality of the samples in the frequency domain that are located near the peak sample in a time domain.

One embodiment of the weighted average includes a weighted average of the amplitudes of the samples in the frequency domain within a region of interest around the peak sample.

One embodiment of the region of interest includes a number of the samples in the frequency domain that were sampled both earlier in time and later in time than the peak sample. The number of samples may be greater than 5, greater than 10, greater than 15, greater than 20, or greater than 25.

One embodiment of the region of interest includes the samples in the frequency domain having an amplitude that is greater than a threshold amplitude.

In one embodiment of the method, the analysis of the plurality of samples in the frequency domain includes calculating a fast Fourier transform of each of the plurality of samples.

In another embodiment, the analysis of the plurality of samples in the frequency domain comprises analyzing the plurality of samples using the Goertzel algorithm.

In yet another embodiment, the analysis of the plurality of samples in the frequency domain includes analyzing the plurality of samples using a software implemented amplitude demodulation circuit.

One embodiment of identifying the peak sample includes identifying the peak sample as a previously identified peak sample corresponding to a prior electrical response signal containing an indicator of a prior magnetostrictive response to a prior magnetostrictive excitation when a sum of the amplitudes of the plurality of samples within the targeted frequency range lies outside an expected amplitude range.

One embodiment of the target magnet includes a stack of magnets adjacent the waveguide and extending along an axis of the waveguide.

One embodiment of the magnetostrictive excitation includes a mechanical excitation of the waveguide or an electrical excitation transmitted through the waveguide.

One embodiment of a magnetostrictive position measuring system includes a waveguide, a magnetostrictive excitation generator, a target magnet, and a controller. The magnetostrictive excitation generator is configured to generate a magnetostrictive excitation. The target magnet is movable along the waveguide and is configured to generate a magnetostrictive response through the waveguide in response to the magnetostrictive excitation. The controller is configured to digitally sample an electrical response signal at a sampling rate to obtain a plurality of samples, determine an amplitude of each of the plurality of samples within a target frequency range including analyzing the plurality of samples in a frequency domain, identify a peak sample from the plurality of samples in the frequency domain corresponding to the magnetostrictive response, and determine the time of flight and a position of the target magnet along the waveguide based on the peak sample.

In one embodiment, the peak sample corresponds to one of the plurality of samples in the frequency domain having the largest amplitude, the time of flight extends from a generation of the magnetostrictive excitation to approximately a sample time of the peak sample, and the controller is configured to measure the time of flight using a clock generator.

In one embodiment, the time of flight extends from the generation of the magnetostrictive excitation to an offset from the sample time, and the controller calculates the offset based on a weighted average of the amplitudes of a plurality of the samples in the frequency domain that are located near the peak sample in a time domain.

One embodiment of the weighted average includes a weighted average of the amplitudes of the samples in the frequency domain within a region of interest around the peak sample.

One embodiment of the region of interest includes a number of the samples in the frequency domain that were sampled both earlier in time and later in time than the peak sample.

One embodiment of the region of interest includes the samples in the frequency domain having an amplitude that is greater than a threshold amplitude.

In one embodiment of the system, the controller is configured to identify the peak sample as a previously identified peak sample corresponding to a prior electrical response signal containing an indicator of a prior magnetostrictive response to a prior magnetostrictive excitation when a sum of the amplitudes of the plurality of samples within the targeted frequency range lies outside an expected amplitude range.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
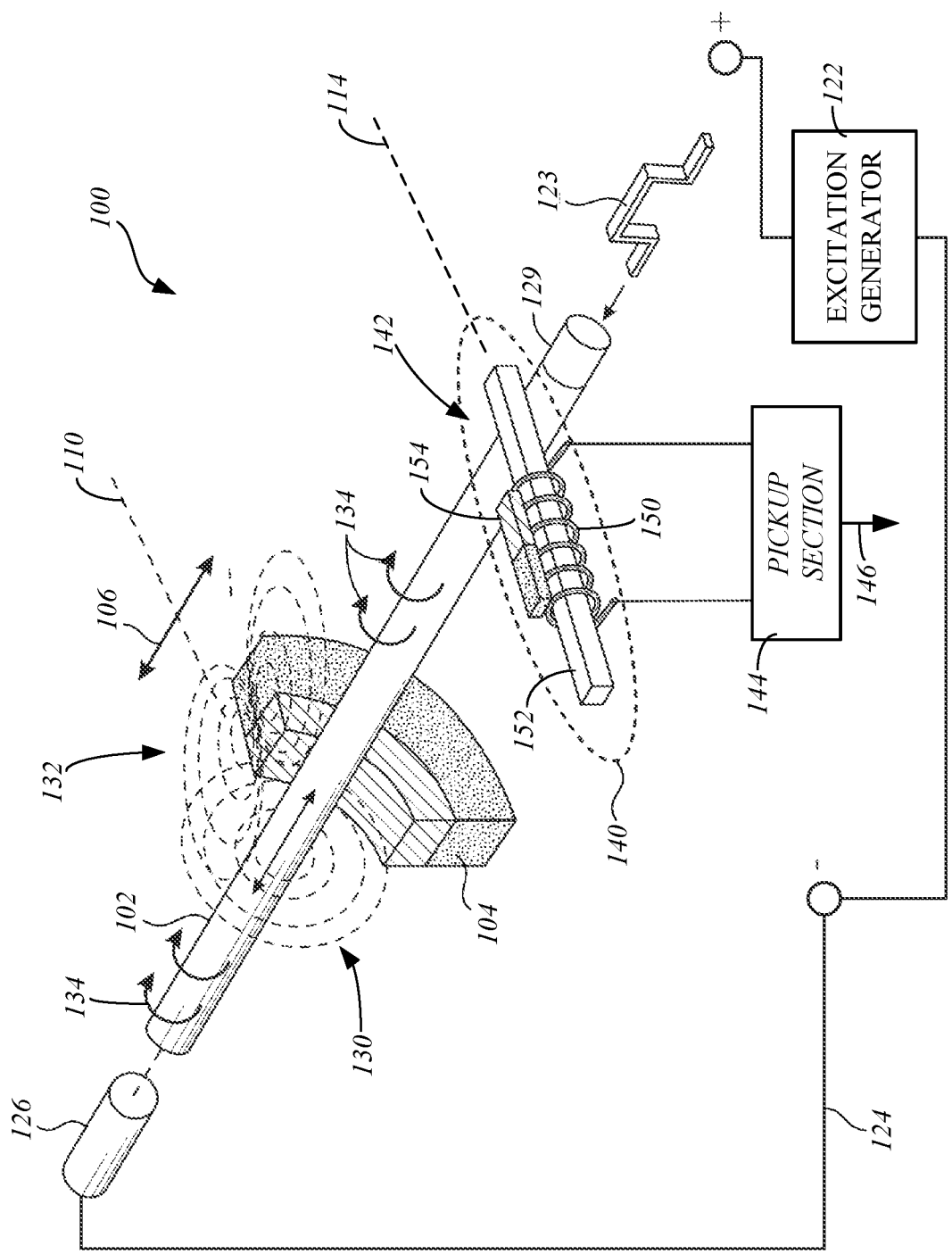
FIG. 1 is a schematic pictorial view of an example of a magnetostrictive position measuring system in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the specific embodiments set forth herein. Rather, embodiments are described so that this disclosure will be thorough and complete, and will fully convey the scope of the embodiments to those skilled in the relevant art.

Figure 2:
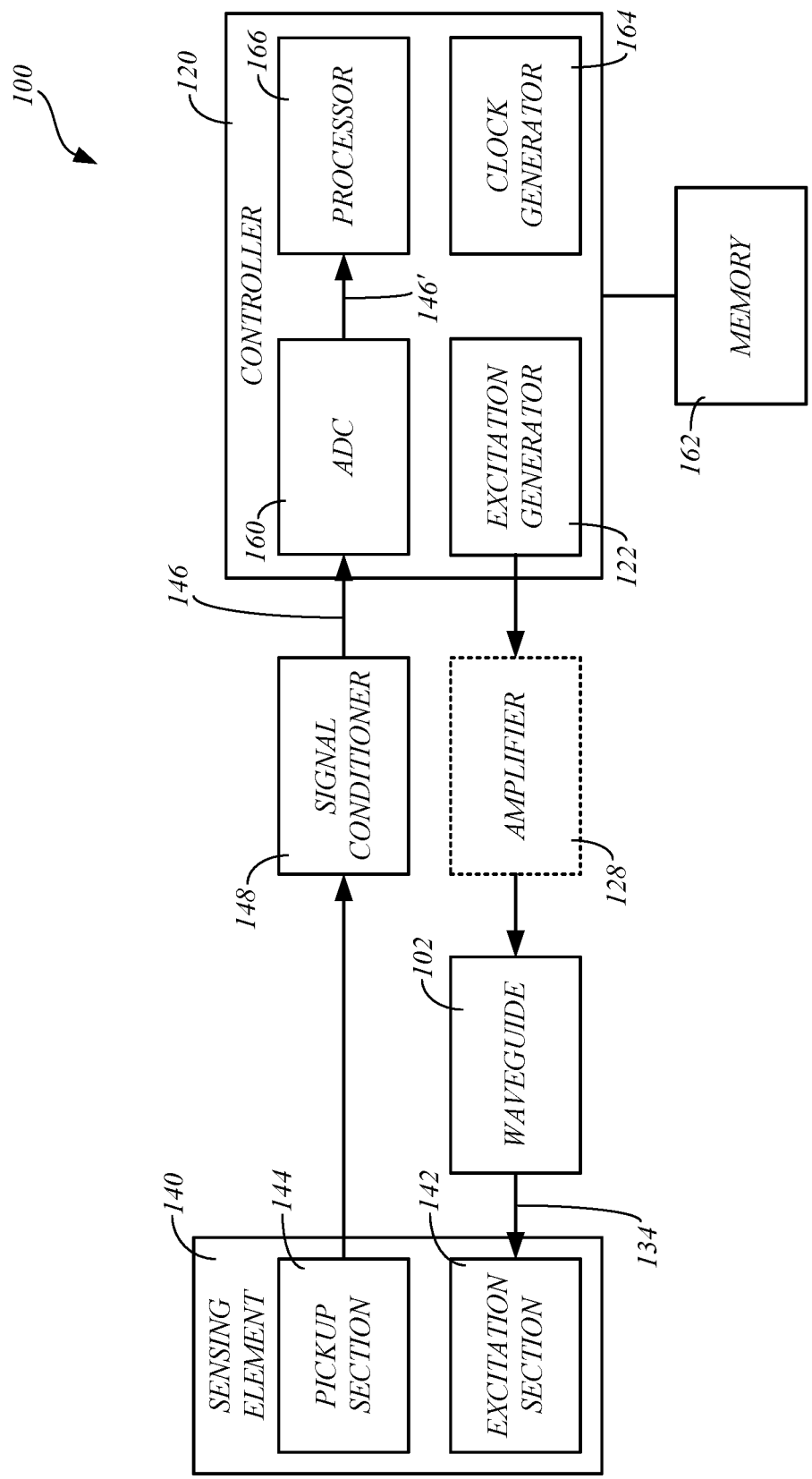
FIG. 2 is a simplified circuit diagram of an example of a magnetostrictive position measuring system in accordance with embodiments of the present disclosure.

FIGS. 1 and 2 respectively are a schematic pictorial view and a simplified circuit diagram of an example of a magnetostrictive position measuring system 100, in accordance with embodiments of the present disclosure. The system 100 includes a wire having magnetoelastic properties, referred to as a waveguide 102 and a target magnet 104 located adjacent to the waveguide 102.

The target magnet 104 may comprise one or more magnets (e.g., permanent magnets or electromagnets), such as a single magnet or a stack of magnets. Additionally, the system 100 may include multiple target magnets 104 that are separated from each other along the waveguide 102. In some embodiments, the target magnet 104 may surround the waveguide 102. Each target magnet 104 is movable relative to the waveguide 102 along an axis 106, and has a position 110 along the axis 106 from a reference position 114 that is to be detected by the system 100.

A controller 120 (FIG. 2) of the system 100 includes a magnetostrictive excitation generator 122. In the example system of FIG. 1, the generator 122 is in the form of an electric pulse generator that generates an electrical magnetostrictive excitation in the form of an electrical current pulse 123, which in turn, causes a mechanical magnetostrictive excitation (e.g., a torsional strain on the waveguide 102) in accordance with conventional magnetostrictive systems.

A closed electrical circuit is formed by the pulse generator 122, the waveguide 102, and a return wire 124 that connects the end 126 of the waveguide 102 back to the pulse generator 122. The pulse generator 122 is configured to deliver the electrical pulse 123 to an end 129 of the waveguide 102. An amplifier 128 (FIG. 2) may be used to amplify the electrical pulse 123 before applying it to the waveguide 102.

The transmission of the electrical pulse 123 through the waveguide 102 generates a magnetic field 130 that interacts with the magnetic field 132 of the magnet 104 to generate a magnetostrictive response in the form of a torsional strain on the waveguide 102 at the magnet 104, which is transmitted along the waveguide 102 as a magnetostrictive response in the form of torsional or acoustic (ultrasonic) waves (hereinafter "acoustic waves") represented by arrows 134.

The acoustic waves 134 travel from both sides of the magnet 104 along the waveguide 102. For example, an acoustic wave 134 may travel along the waveguide from the position 110 of the magnet 104 toward the end 126 of the waveguide 102 and possibly to a damper (not shown) that attenuates the acoustic waves 134 and reduces or eliminates propagation of the acoustic wave 134 back through the waveguide 102 toward the end 129. Additionally, an acoustic wave 134 travels from the position 110 of the magnet 104 to a sensing element 140 adjacent the end 129 of the waveguide 102.

The sensing element 140 generally includes an excitation section 142 and a pickup section 144. The excitation section 142 produces an electrical signal 146 that includes an indicator of the acoustic wave 134. The pickup section 144 delivers the electrical response signal 146 to the controller 120 for processing, such as after the electrical response signal 146 is conditioned using a signal conditioner 148 (FIG. 2).

Referring back to FIG. 1, one example of the excitation section 140 includes a coil 150 that is attached to the waveguide 102, such as through rigid member 152. A magnet 154 has a magnetic field that surrounds the coil 150, which produces the electrical response signal 146. When the acoustic wave 134 reaches the member 152, the acoustic wave 134 vibrates the member 152, which moves the coil 150 within the magnetic field of the magnet 154. This induces a current through the coil 150 that forms an indicator of the reception of the acoustic wave 134 in the electrical response signal 146, which is delivered to the controller 120 by the pickup section 144. The signal conditioner 148 may be used to amplify or otherwise condition the electrical response signal 146 prior to its delivery to the controller 120, as indicated in FIG. 2.

One alternative to this arrangement is to form the member 152 out of a magnetic material and support the coil 150 in a manner that allows the magnetic member 152 to move relative to the coil 150. Thus, when the magnetic member 152 vibrates in response to the acoustic wave 134, the electrical response signal 146 is induced in the coil 150 due to the movement of the magnetic field relative to the coil 150. It should be noted that the specific manner in which signal 146 is generated can take a number of form with the components described and illustrated schematically being only exemplary.

The controller 120 may include an analog-to-digital converter (ADC) 160 that converts the analog electrical response signal 146 into digital samples 146'. For example, the ADC 160 may sample the analog signal 146 at a frequency that allows the response signal 146 to be further processed by the controller 120. The digital samples 146' may be stored in a memory 162 of the system 100 or a buffer of the controller 120, for example.

The controller 120 may include a clock generator 164 that begins a timing routine when the magnetostrictive excitation is generated by the excitation generator 122, such as when the electrical current pulse 123 is generated. The clock generator 164 may be used to determine the time of each digital sample relative to the generation of the magnetostrictive excitation.

The controller 120 may comprise a processor 166 that controls components of the system 100, and/or performs one or more functions described herein in response to the execution of instructions, which may be stored locally in non-transitory memory 162 or computer-readable media (e.g., flash memory, optical data storage, magnetic data storage, etc.) of the system 100. In some embodiments, the processor 166 of the controller 120 may comprise one or more computer-based systems, control circuits, microprocessor-based engine control systems, and/or programmable hardware components (e.g., field programmable gate array), for example.

In some embodiments, the processor 166 is configured to analyze the digital samples of digital response signal 146' to detect the indicator of the acoustic wave 134, and establish the time of flight for the acoustic wave 134 to travel from the unknown position 110 of the magnet 104 to the reference position 114 at the sensing element 140. Since the speed at which the acoustic wave 134 travels through the waveguide 102 is known, the distance of the unknown position 110 to the reference position 114 may be determined based on the time of flight.

As discussed above, conventional techniques for detecting the indicator of the acoustic wave 134 in the response signal 146 generally involve analyzing the electrical response signal produced by a sensing element 140 in the time domain. This may involve determining a time when the electrical response signal 146 crosses a predetermined threshold voltage, or matching the electrical response signal in the time domain to predetermined waveforms. However, these methods rely upon an expectation that the electrical response signal 146 will have a specific shape. Thus, in the event the electrical response signal changes (e.g., a phase shift), such as due to the target magnet 104 being replaced with a different magnet that produces a different magnetostrictive response, a deterioration of the steel housing for the target magnet 104, or other changes to the system 100, these conventional detecting schemes may inhibit or prevent the detection of the indicator of the acoustic wave 134 in the electrical response signal, or may adversely affect the accuracy of the position measurement.

Embodiments of the present disclosure include methods for detecting the indicator of the acoustic wave 134 in the electrical response signal 146, from which the time of flight and the position 110 of the target magnet 104 along the waveguide 102 may be determined. In some embodiments, the method may be performed using the system 100, such as using the processor 166 of the controller 120, in response to the execution of program instructions stored in the memory 162, for example.

Embodiments of the methods analyze the electrical response signal 146 in the frequency domain, which overcomes deficiencies of conventional techniques that analyze the electrical response signal in the time domain. For example, embodiments of the methods are more adaptable to handling changing magnetostrictive response signals caused by changes to the target magnet 104 or other changes to the system 100 that can cause changes to the magnetostrictive response signal, such as a phase shift of the signal. The analysis of the electrical response signal 146 in the frequency domain focuses on an envelope surrounding the indicator of the acoustic wave 134 and avoids the problems of the time domain signal analysis of conventional techniques.

Figure 3:
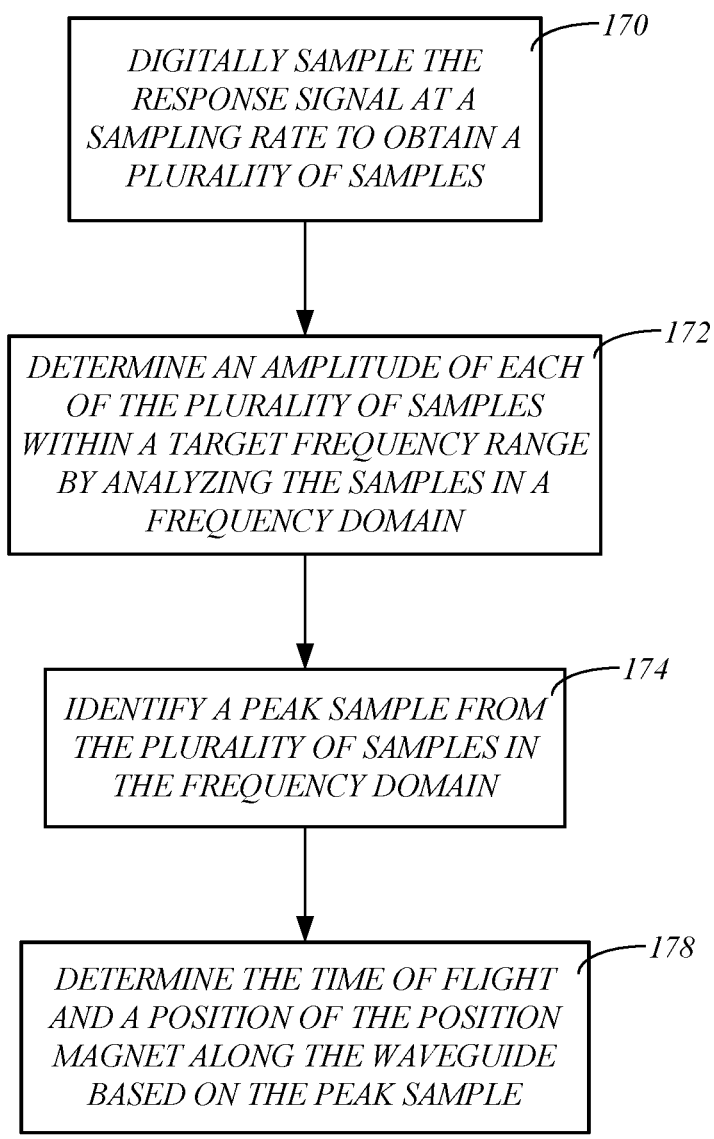
FIG. 3 is a flowchart illustrating an example of a magnetostrictive position measuring method in accordance with embodiments of the present disclosure.

FIG. 3 is a flowchart illustrating an example of a magnetostrictive position measuring method for determining a time of flight of a magnetostrictive response transmitted through a waveguide 102, the response signal generated using a target magnet 104 in response to a magnetostrictive excitation, in accordance with embodiments of the present disclosure. At 170, the electrical response signal 146 containing an indicator of the magnetostrictive response is sampled at a sampling rate to obtain a plurality of digital samples 146'.

As discussed above, the magnetostrictive response generated by the target magnet 104 may be transmitted through the waveguide 102 as an acoustic wave 134 and is indicated in the electrical response signal 146 generated by the sensing element 140. The analog electrical response signal 146 form of the magnetostrictive response signal may be sampled, possibly after conditioning by the signal conditioner 148, by the ADC 160 to generate the digital samples 146'. The sampling rate of the ADC 160 may be set to a desired value, such as 10 MHz, or another suitable frequency.

The ADC 160 may sample the electrical response signal 146 for a sampling period corresponding to the longest expected time of flight. For example, the sampling period may be 0.1 milliseconds when the farthest position of the target magnet 104 is about 250 mm. For this sampling period and a sampling frequency of 10 MHz, the ADC 160 would provide 1000 samples. If the sampling period was extended to 1 millisecond to handle a maximum position of the target magnet 104 being 2.5 m, the ADC 160 would provide 10,000 samples.

At 172 of the method, the controller 120 determines an amplitude of each of the plurality of samples 146' within a target frequency range by analyzing the samples 146' in a frequency domain. The target frequency range spans the anticipated frequencies of the indicator of the acoustic wave 134 within the electrical response signal 146. The target frequency range may be based on properties of the waveguide 102, and may be determined empirically.

This analysis of the digital samples 146' in the frequency domain may be performed using any suitable technique understood by those skilled in the art. In some embodiments, the frequency domain analysis may be performed by translating the samples 146' into the frequency domain using a fast Fourier transform (FFT) to compute the discrete Fourier transform of the samples representing frequencies found in the signal. Other known techniques for transforming the digital samples 146' or the electrical signal 146 may also be used in step 172 of the method, such as the Goertzel algorithm, or using a software implemented amplitude demodulation circuit, for example.

Some embodiments of the present disclosure operate to improve the performance of the system 100 by reducing the processing load on the processor when performing step 172. In one example, the FFT is performed on only a portion of the samples 146' at a time, such as X number (e.g., 64, 128, etc.) of the samples 146'. Here, a first FFT is performed on samples 1-X, a second FFT is performed on the set of samples 146' from sample X+1 to sample 2X, a third FFT is performed on the set of samples 146' from sample 2X+1 to 3X, and so on. When there are 1000 samples, 936 FFT's will be calculated with FFT number 936 spanning the samples 937 to 1000.

The result of performing the FFT on a set of X samples returns X complex numbers, each representing a bin having a frequency range corresponding to the sampling frequency divided by X. Thus, when the sampling frequency is 10 MHz and X is 64, the FFT on the 64 samples produces 64 complex numbers, 32 of which relate to complex signals and are ignored. Each of the 32 remaining complex numbers represent a bin, in this example, covering a frequency range of 156 kHz (10 MHz/64). Accordingly, the first bin spans the frequencies of 0-156 kHz, the second bin spans the frequencies of 157-313 kHz, etc.

The amplitude of the portion of the response signal spanning the X samples may be determined based on the complex numbers output by the FFT. Each FFT outputs a real part (a) and an imaginary part (ib) that may be written as a vector (a+ib). The magnitude of the vector corresponds to the amplitude of the response signal within the corresponding frequency range (e.g., 157-313 kHz). The magnitude may be calculated using the Pythagorean theorem (e.g., amplitude=SQR(a^2+b^2).

In some embodiments, the FFT bins that are not within the target frequency range may be discarded from this amplitude calculation, which saves both processing and memory resources of the system 100, and improves the efficiency at which step 172 may be performed. Thus, if the targeted frequency range is covered by the second bin in the example provided above (157-313 kHz), then the amplitude calculations are only performed on the second bin of each FFT. Accordingly, each FFT will have an associated amplitude for the portion of response signal corresponding to the samples 146' that is within the targeted frequency range.

Figure 4:
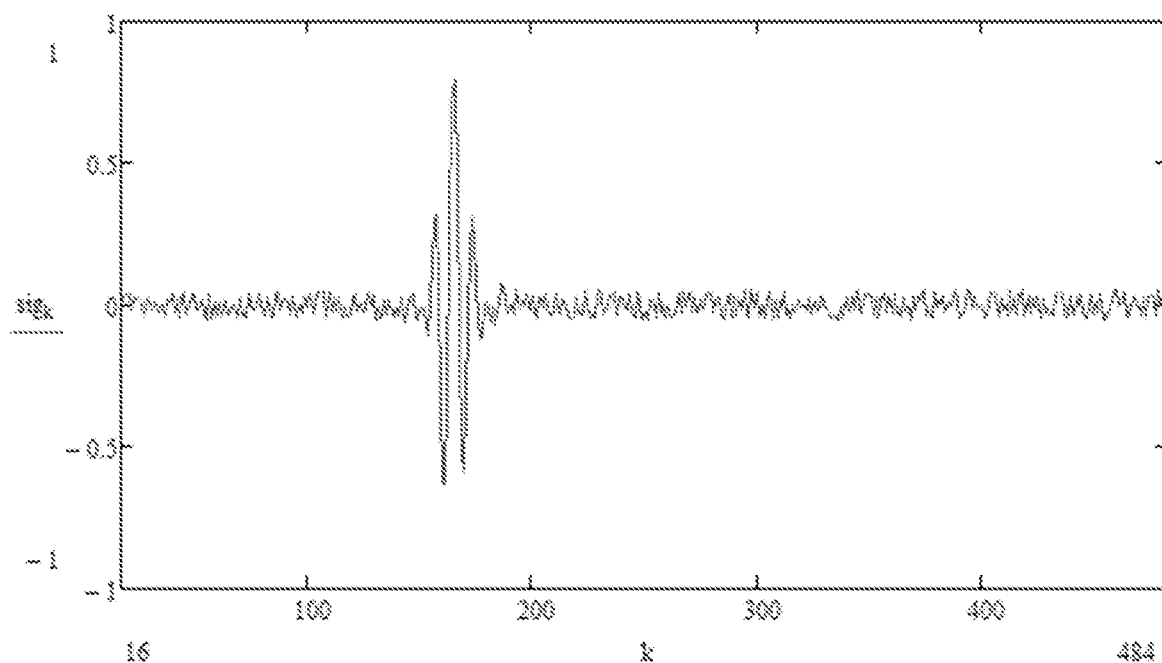
FIG. 4 is a chart of digital samples of an example response signal in the time domain.
Figure 5:
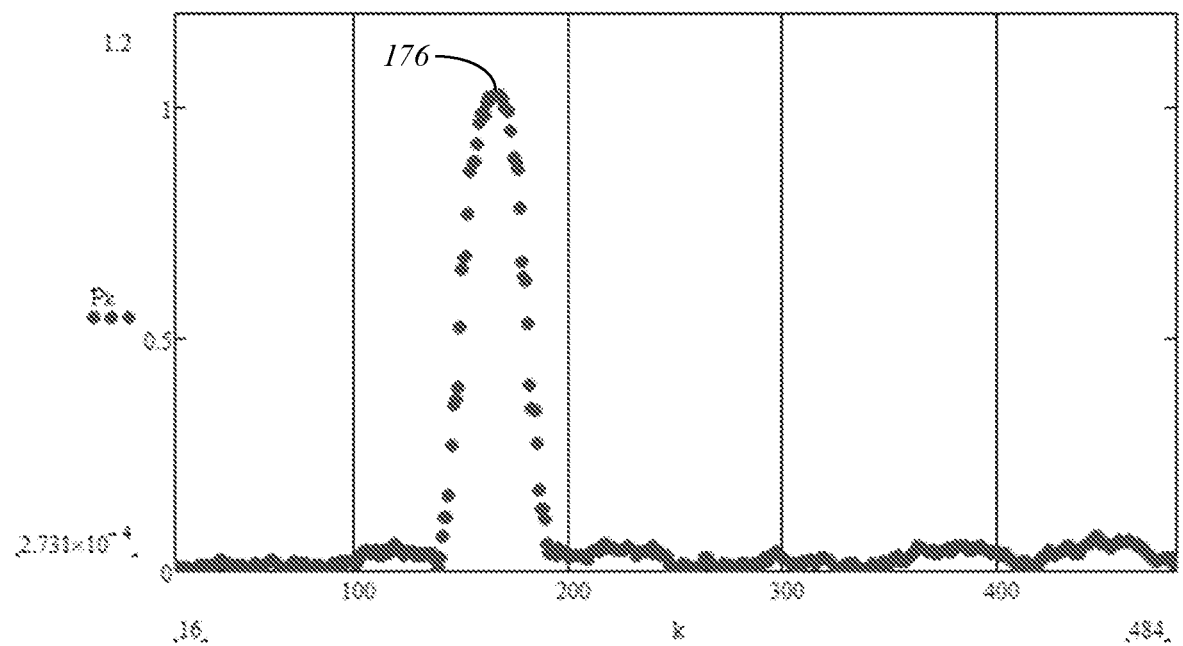
FIG. 5 is a chart of the amplitudes within a targeted frequency range of the samples of the signal shown in FIG. 4 calculated in the frequency domain.

FIG. 4 is a chart of digital samples 146' of an example response signal (voltage over sample number or time) in the time domain, and FIG. 5 is a chart of the calculated FFT amplitudes of the samples 146' within the targeted frequency range. In this example, the indicator of the acoustic wave 134 for determining the time of flight of the magnetostrictive response occurs within the range of samples 150-190. Rather than attempting to identify a lobe of the electrical response signal in the time domain (FIG. 4) over the samples 150-190, such as a portion that exceeds a threshold, or matching the pattern of the samples 150-190 to a predetermined template, embodiments of the present disclosure use the peak amplitude of the samples 146' in the frequency domain corresponding to the targeted frequency range as the trigger for determining the time of flight.

Thus, at 174 of the method, a peak sample 176 (FIG. 5) is identified from the plurality of samples in the frequency domain, and at 178, the time of flight and the position 110 of the target magnet 104 along the waveguide 102 is determined based on the peak sample 176. The controller 120 may then output the time of flight or the position of the target magnet 104 using any suitable technique.

In some embodiments, the peak sample 176 identified in step 174 corresponds to the sample 146' having the largest calculated FFT amplitude. Thus, for example, if the amplitude of FFT number 550 is the largest among the 936 FFT's, then digital sample number 550 is selected as corresponding to the peak sample 176. In some embodiments, the peak sample 176 is then used to determine the time of flight and the position 110 of the target magnet 104 along the waveguide 102 in step 178.

The time of flight may be approximated as the time (sample time) that has passed from the generation of the magnetostrictive excitation to the generation of the peak sample 176, which may be determined using the clock generator 164, such as a clock signal output by the clock generator 164. Since the speed at which the acoustic wave 134 generated by the magnetostrictive response travels along the waveguide 102 is known, this time of flight may be used to determine the position 110 of the target magnet 104 along the waveguide 102.

For example, if the peak sample 176 is sample number 550, the time of flight or sample time may correspond to the sample number divided by the sampling frequency (e.g., 550/10 MHz=0.0550 ms). If the speed of travel of the acoustic wave 134 along the waveguide is 2822 m/s, then the distance the acoustic wave traveled along the waveguide from the position 110 is calculated as distance=0.0550 ms*2822 m/s=155.21 mm.

For some applications the above-described technique may be too course of a measurement of the time of flight and the position 110 of the target magnet 104. In some embodiments, a more precise measurement of the time of flight may be determined by calculating an offset from the sample time of the peak sample 176 to more precisely match the time of flight to the actual peak amplitude of the electrical response signal. In one example, the offset is based on a weighted average of the calculated amplitudes of the samples 146' in the frequency domain that are within a region of interest around the peak sample 176.

In some embodiments, the region of interest around the peak sample 176 comprises a number of the samples 146' in the frequency domain that were sampled both earlier in time and later in time than the peak sample 176. Thus, the region of interest may include 5 or more, 10 or more, 15 or more, 20 or more, or 25 or more samples that occur earlier in time and later in time around the peak sample 176. For example, the region of interest may include the 10 samples 146' that occur immediately prior to the peak sample 176, and the 10 samples 146' that occur immediately after the peak sample 176.

In another embodiment, the region of interest around the peak sample 176 may be selected based upon the amplitudes of the surrounding samples 146' calculated in the frequency domain for the targeted frequency range. For example, the region of interest may be determined based on the amplitudes of the samples 146' surrounding the peak sample having a corresponding amplitude that exceeds a threshold amplitude from the amplitude of the peak sample 176, or another threshold amplitude.

The offset calculation based on the weighted average of the samples 146' within the region of interest may be calculated using any suitable technique. In one example, the offset is calculated using the equation provided below for a region of interest being the 25 samples 146' that are earlier in time and later in time than the peak sample 176 (ps).

$$\text{Offset}=[A(ps-25)*(-25)+A(ps-24)*(-24)+ \ldots +A(ps+24)*(24)+A(ps+25)*(25)]/(\Sigma A)$$

Where ps is the peak sample number (e.g., 550), A(#) is the calculated amplitude of the sample number in the frequency domain, and $\Sigma A$ is the sum of the amplitudes of the samples used in the equation (e.g., sum of the amplitudes ps−25 through ps+25). The calculated offset value will be a small number that may be added to the sample number to more precisely identify the time location of the peak amplitude of the electrical response signal in the frequency domain for the target frequency range. For example, the offset may be 0.826, which provides 550.826 when added to the peak sample number of 550. This new sample time may then be used to calculate the time of flight by dividing the sample time by the sampling frequency (550.826/10 MHz=0.0550826 ms). This time of flight may then be used to calculate the distance=0.0550826 ms*2822 m/s=155.44 mm.

Figure 6:
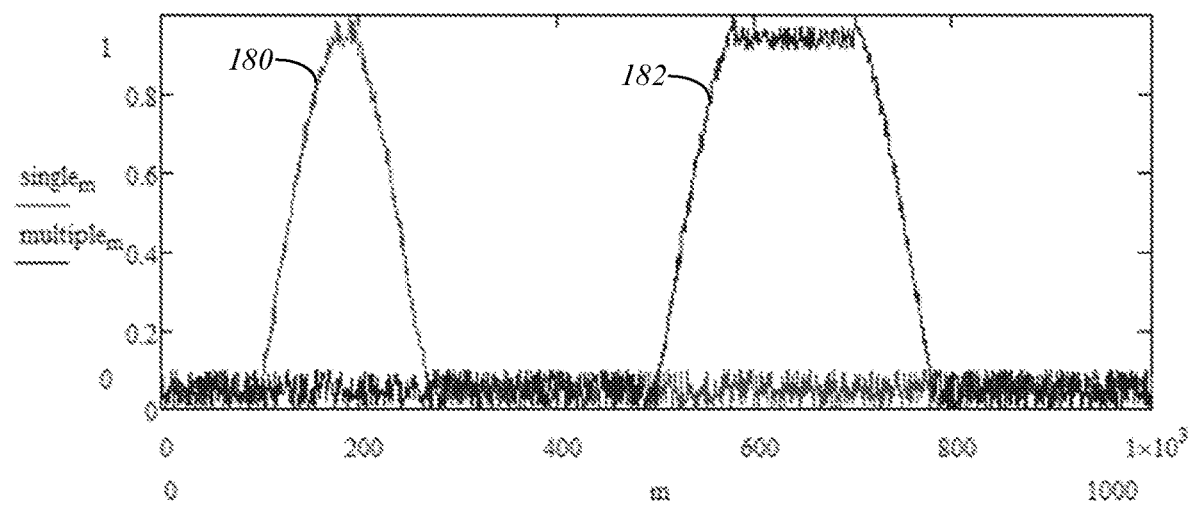
FIG. 6 is a chart of amplitudes within a targeted frequency range of samples of electrical response signals corresponding to magnetostrictive responses from short and long target magnets.

As mentioned above, the target magnet 104 may comprise more than one magnet, such as two or three magnets, to expand the length of the target magnet 104 along the axis 106. This allows for shaping of the magnetic field 132 towards a geometry that is optimized for creating the torsional or acoustic wave 134. Using the method described above opens additional approaches over the conventional prior art techniques of detecting a leading edge of the electrical response signal in the time domain. For example, the electrical response signal as a whole may be used to determine the position 110 of the target magnet 104. Thus, when the length of the target magnet 104 is extended, such as by stacking multiple magnets, the analog response signal can grow multiple times longer, as illustrated in FIG. 6, which is a chart of the amplitude of the digital samples 146' calculated in step 172 of the method for a single or short target magnet (plot 180) and multiple stacked or long target magnet 104 (plot 182).

The elongated signal provided by the multiple stacked or long target magnet configuration includes the availability of more points that can be used for detecting the indicator of the magnetostrictive response in steps 174 and 178. For example, steps 174 and 178 essentially operate to detect the center of the response signal, which, for short target magnets 104 (plot 180), corresponds to approximately the peak amplitude of the electrical response signal. With the longer target magnet 104 (plot 182) the method steps 174 and 178 may be tailored to detecting the center of the peak plateau. This may improve the accuracy of the calculation due to improved noise suppression.

Additionally, the longer the distance the acoustic wave 134 generated by the magnetostrictive response must travel along the waveguide 102, the more the signal is weakened by attenuation and dispersion. The use of stacked magnet configuration for the target magnet 104 increases the amplitude of the magnetostrictive response, which also increases the magnitude of the acoustic wave 134. The stronger acoustic wave signal 134 facilitates easier detection and the use of longer waveguides 102.

In some embodiments, the system 100 may be configured to have multiple target magnets 104 at different locations along the waveguide 102. In some embodiments, each of the target magnets 104 has a different length along the axis 106, resulting in a unique magnetostrictive response to the magnetostrictive excitation at each location. In one example, the closest target magnet 104 to the sensing element 140 has the shortest length, while the farthest target magnet 104 has the longest length. This configuration takes advantage of having the stronger magnetostrictive response produced at farther locations from the sensing element 140, to overcome attenuation of the acoustic wave response signal 134.

Additional embodiments of the present disclosure operate to provide diagnostics on a position measurement and/or the system 100. In one embodiment, the controller 120 sums the calculated FFT amplitudes of the digital samples 146' for the targeted frequency range, and compares the sum to an expected amplitude threshold value or amplitude range. The expected amplitude threshold value or amplitude range are selected to distinguish normal operating values for the sum from values that indicate that a disruption or other error may have occurred during the measurement. Thus, when the sum of the amplitudes meets an expected relationship to the amplitude threshold value or amplitude range, the controller 120 determines that the detected position of the target magnet 104 based on the samples 146' is valid. However, when the sum of the amplitudes does not meet the expected relationship to the amplitude threshold value or amplitude range, the controller 120 determines that the detected position of the target magnet 104 based on the samples 146' is invalid. In one embodiment, when the controller 120 determines that the detected position of the target magnet 104 is invalid, the previous detected position or time of flight corresponding to the magnet 104 is used as the detected position or time of flight for the current measurement.

Although the embodiments of the present disclosure have been described with reference to preferred embodiments, workers skilled in the art will recognize that changes may be made in form and detail without departing from the spirit and scope of the present disclosure.

What is claimed is:

1. A magnetostrictive position measuring method for determining a time of flight of a magnetostrictive response transmitted through a waveguide, the magnetostrictive response generated using a target magnet in response to a magnetostrictive excitation, the method comprising:
   generating an electrical response signal from the magnetostrictive response;
   digitally sampling the electrical response signal at a sampling rate to obtain a plurality of samples;
   providing a target frequency range that is less than a larger set of frequencies available from the plurality of samples;
   determining an amplitude of each sample of the plurality of samples for each frequency in the target frequency range;
   identifying a peak sample from the plurality of samples; and
   determining the time of flight and a position of the target magnet along the waveguide based on the peak sample.

2. The method of claim 1, wherein:
   the peak sample corresponds to one of the plurality of samples in having a largest amplitude among amplitudes of all samples of the plurality of samples; and
   the time of flight extends from a generation of the magnetostrictive excitation to approximately a sample time of the peak sample and is measured using a clock generator.

3. The method of claim 2, wherein:
   the time of flight extends from the generation of the magnetostrictive excitation to an offset from the sample time; and
   the offset is calculated using a weighted average of the amplitudes of the plurality of samples that are located near the peak sample.

4. The method of claim 3, wherein the weighted average includes a weighted average of the amplitudes of the samples in the frequency domain within a region of interest around the peak sample.

5. The method of claim 4, wherein the region of interest comprises a number of the samples in the frequency domain that were sampled earlier in time and later in time than the peak sample.

6. The method of claim 5, wherein the number is selected from the group consisting of greater than 5, greater than 10, greater than 15, greater than 20 and greater than 25.

7. The method of claim 4, wherein the region of interest comprises the samples in the frequency domain having an amplitude that is greater than a threshold amplitude.

8. The method of claim 1, wherein analyzing the plurality of samples in the frequency domain comprises calculating a fast Fourier transform of each of the plurality of samples.

9. The method of claim 1, wherein analyzing the plurality of samples in the frequency domain comprises analyzing the plurality of samples using a Goertzel algorithm.

10. The method of claim 1, wherein analyzing the plurality of samples in the frequency domain comprises analyzing the plurality of samples using a software implemented amplitude demodulation circuit.

11. The method of claim 1, and further comprising:
    calculating a sum of the amplitudes of the plurality of samples within the targeted frequency range; and
    comparing the sum with an expected amplitude threshold value or amplitude range.

12. The method of claim 1, wherein the target magnet comprises a stack of magnets adjacent the waveguide and extending along an axis of the waveguide.

13. The method of claim 1, wherein the magnetostrictive excitation is in a form of a mechanical excitation of the waveguide or an electrical excitation transmitted through the waveguide.

14. A magnetostrictive position measuring system comprising:
    a waveguide;
    a magnetostrictive excitation generator configured to generate a magnetostrictive excitation;
    a target magnet that is moveable along the waveguide and is configured to generate a magnetostrictive response through the waveguide in response to the magnetostrictive excitation;
    a sensing element configured to generate an electrical response signal from the magnetostrictive response; and
    a controller configured to:
       digitally sample the electrical response signal associated with the magnetostrictive response at a sampling rate to obtain a plurality of samples;
       determine an amplitude of each sample of the plurality of samples within a target frequency range in a frequency domain that is less than a larger set of frequencies available front the plurality of samples;
       identify a peak sample from the plurality of samples in the frequency domain; and
       determine a time of flight and a position of the target magnet along the waveguide based on the peak sample.

15. The system of claim 14, wherein:
    the peak sample corresponds to one of the plurality of samples in the frequency domain having a largest amplitude among amplitudes of all samples of the plurality of samples;
    the time of flight extends from a generation of the magnetostrictive excitation to approximately a sample time of the peak sample; and
    the controller is configured to measure the time of flight using a clock generator.

16. The system of claim 15, wherein:
    the time of flight extends from the generation of the magnetostrictive excitation to an offset from the sample time; and
    the controller calculates the offset based on a weighted average of the amplitudes of the plurality of samples in the frequency domain that are located near the peak sample.

17. The system of claim 16, wherein the weighted average includes a weighted average of the amplitudes of the samples in the frequency domain within a region of interest around the peak sample.

18. The system of claim 17, wherein the region of interest comprises a number of the samples in the frequency domain that were sampled both earlier in time and later in time than the peak sample.

19. The system of claim 17, wherein the region of interest comprises the samples in the frequency domain having an amplitude that is greater than a threshold amplitude.

20. The system of claim 14, wherein the controller is configured to calculate a sum of the amplitudes of the plurality of samples within the targeted frequency range and compare the sum with an expected amplitude threshold value or amplitude range.

\* \* \* \* \*